Oct. 24, 1933.   A. BERNARDI   1,931,920
COLOR CINEMATOGRAPHY AND THE LIKE
Filed Jan. 28, 1930   2 Sheets-Sheet 1
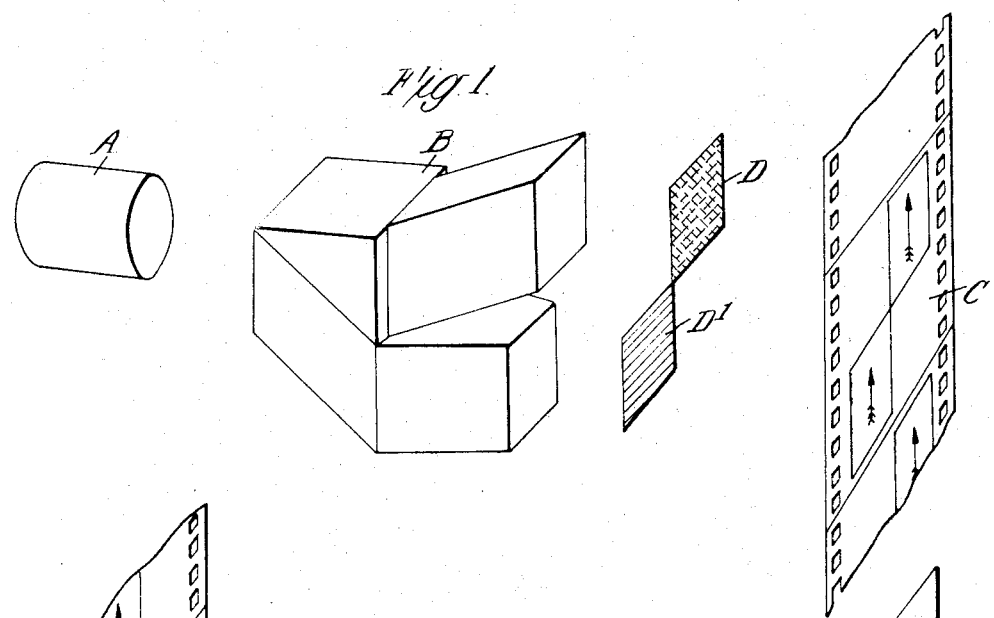
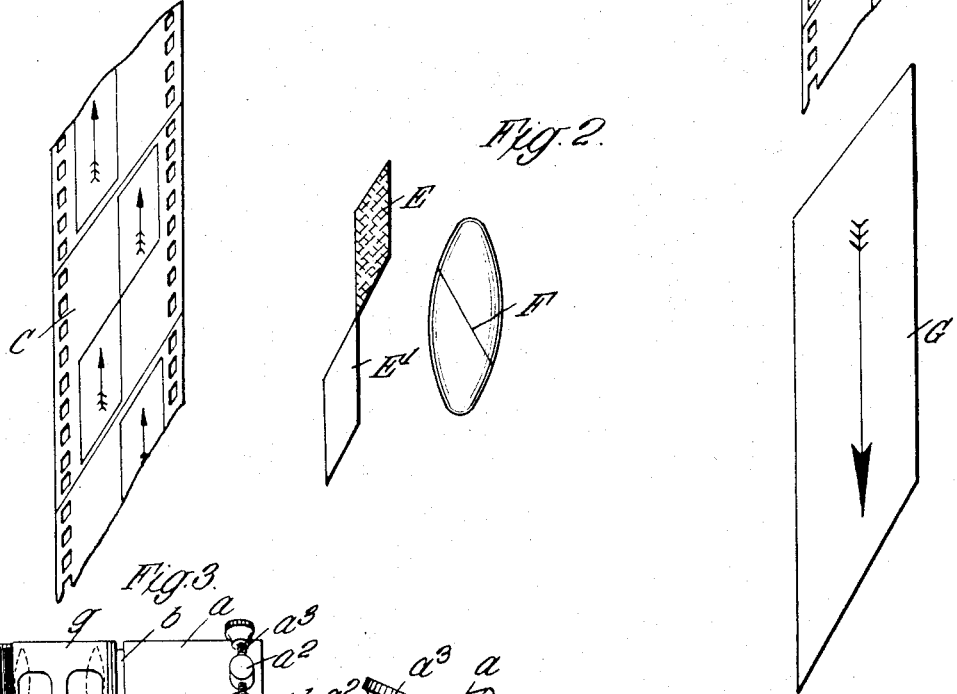
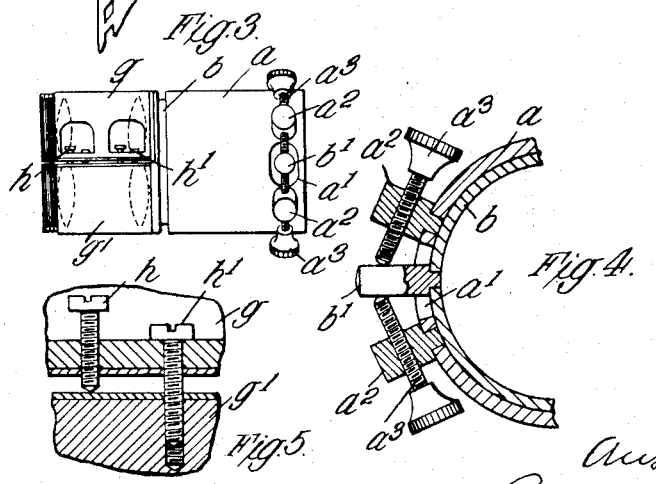

Oct. 24, 1933.  A. BERNARDI  1,931,920
COLOR CINEMATOGRAPHY AND THE LIKE
Filed Jan. 28, 1930  2 Sheets-Sheet 2

Inventor:
Anthony Bernardi,

Patented Oct. 24, 1933

1,931,920

UNITED STATES PATENT OFFICE 1,931,920

COLOR CINEMATOGRAPHY AND THE LIKE

Anthony Bernardi, London, England, assignor, by mesne assignments, to Raycol British Corporation Limited, London, England, a corporation of Great Britain Application January 28, 1930, Serial No. 424,068, and in Great Britain March 19, 1929

5 Claims. (Cl. 88—16.4)

This invention relates to the exhibition of pictures in colors, for example, by means of cinematographs, magic lanterns and the like.

In color cinematography as heretofore proposed the film has been taken with two or more color components such, for example, as red and bluish green and the film, after development, is projected through color filters of the same, or substantially the same, color values as those employed in the taking process, the two color components either being super-imposed on the screen or projected successively on to the screen so that they more or less register, whereby the pictures are exhibited in color due to the phenomenon known as "persistence of vision". The use of these filters, however, in the projection process leads to a great loss of light and hence not only does the illuminant employed in the projection have to be of considerably greater intensity than in ordinary monochromatic cinematography but there has heretofore always been a certain lack of brilliancy in the projected colored picture which is thus not at all pleasing to the eye. Furthermore, when the color component pictures are projected successively on to the screen the eye is fatigued.

It has also been proposed but, as far as I am aware, never carried into practice, to take a film with exposures alternately through a red filter and without a filter so that alternate pictures are thus a "red" component and a plain black and white picture. It was proposed to project these pictures successively on to the screen relying on the phenomenon of persistence of vision. Such a process has, however, many disadvantages and will not successfully produce pictures in substantially natural colors.

I have discovered, however, that if the film be taken through orange and blue-green filters so that there is an "orange" component and a "blue-green" component and the film so taken is projected, the "orange" component through an orange filter and the "blue-green" component without a filter so that there is on the screen an orange image of the "orange" component and a black and white image of the "blue-green" component, then under these circumstances the orange light projected upon the screen appears to evoke by contrast and fatigue the complementary blue and green colors and a very pleasing picture is produced in substantially natural colors.

In the photographing operation, an ordinary cinematographic or other camera may be employed, but a dividing prism or other reflecting system carrying the required filters—orange and blue-green, let us say—should be interposed between the lens and the film. Whilst the photograph is being taken, therefore, light from any single point of the object in the field-of-view passes through the lens and is divided by the prism into two approximately equal bundles of rays. One bundle passes through the orange filter before coming to a focus to form a picture on the film, whilst the second bundle similarly passes through a blue-green filter to form the second picture on the film. In the preferred arrangement these two color component pictures are produced in opposite corners (that is diagonally) of the single picture space of the ordinary film. The negative thus produced is developed in the ordinary way, and the positive is developed and printed also in the ordinary way.

In the second operation, that of projecting on to the screen, an ordinary projector, is employed, with the exception that the single picture-projecting lens, in the preferred arrangement, is replaced by a pair of such lenses, one for each of the two pictures occurring in the usual picture space of the ordinary film. The "orange" component picture photographed as already described, through an orange filter is projected through a similar filter, so that there is produced upon the screen a photograph of the object taken with orange light only. The second color component picture is projected simply by the second lens without any filter at all, so that in the absence of the orange picture the picture taken through the blue-green filter appears finally on the screen in black-and-white. Instead of using two projecting lenses one only may be employed working in combination with a prismatic or other reflector to collect the light from the two pictures, and reflect it through the single lens or both lenses may be fitted with reflectors. One filter only is used, as in the arrangements already referred to. The two pictures thus projected are carefully superposed, when the resulting picture is seen, not in orange light only, but in a range of substantially natural colors extending more or less throughout the spectrum.

It must be remembered that the black-and-white picture thrown upon the screen without a filter is one that has been photographed through a blue-green filter. The various shades of grey, therefore, which occur in it, ranging from white to black, represent more or less proportionally the amount of blue-green light given off by the different parts of the object, and utilized for the production of the picture on the film. This fact is probably responsible for the differentiation of the green-blue colors which ultimately results.

The theory of the method which it is sought to cover by this application is perhaps incomplete. It has been known to physicists for a long time that complementary colors can be produced by mere contrast and also by retinal fatigue. The great advantage of evoking color in this way is that it allows of a very substantial increase in the amount of light which falls upon the screen from the source of light in the lantern. This increase is probably of the order of 30%.

With the particular pair of filters assumed, the crucial colors—white and flesh tints—are rendered with great fidelity, but generally speaking the colors at the red end of the spectrum are better reproduced than those at the blue end of the spectrum, but by the use of appropriate pairs of substantially complementary filters any desired portion of the colors of the spectrum can no doubt be brought out dominantly. The invention, therefore, is not limited to the use of any particular pair of color filters.

In this method of projecting cinematograph films in colors the final result will depend upon:
 (a) The kind of light used for illuminating the object—sunlight, arc light, incandescent light etc.
 (b) The colors of the object itself.
 (c) The light and color transmitting values of the filters.
 (d) The range of the colors to which the film is sensitive.

The filters employed may vary over a considerable range. I have found in practice that Wratten & Wainwrights give excellent results. The particular colors employed can be varied for different objects.

For out-of-door scenes in which foliage and gay colored flower-gardens dominate the scene I have obtained excellent results with Wratten & Wainwright's orange-red and blue-green Nos. 22 and 60 or Nos. 24 and 59. For taking shots in the studio, in which incandescent tungsten lamps are employed, giving off an excess of red light, the filters have to be correspondingly modified, Nos. 29 and 40 then give good results. In selecting a particular pair of filters for photographing a given object these filters must in the first place be practically complementary to one another, and in the second place one of the colors should preferably be one dominant in the object. For all-round work I have found that an orange-red and blue-green give excellent results, the colors at the red end of the spectrum, foliage, flesh tints, and white being reproduced with great fidelity.

It is well known that all green foliage reflects a considerable portion of red light to the eye and it is this fact no doubt that accounts for the satisfactory color reproduction of foliage when using the orange-red filter referred to. Another advantage of using orange-red is that it is possible to match it with a pot glass and use this instead of a gelatine filter in the final projection stage.

In the final projection stage the taking red filter may be used or one of a slightly lighter tint.

It may be desirable for some purposes in order to obtain a desired color balance on the screen to regulate the relative intensities of the light transmitted by the two objectives. This in practice can be done by fitting one or other of the two objectives with an adjustable aperture. This, of course, is equivalent to working the two lenses at different apertures.

Although this invention is more particularly applicable to a two-color process the same is equally applicable to a three-color process. In this case three primary filters would be employed in the photographic stage instead of two, as above described, and in the projecting operation two of the color components would be projected through their corresponding filters, whilst the third would be projected without any filter at all. Or two of the three colors employed in the taking operation may be suppressed in the projecting stage. Further more than three colors may be employed in the taking process, any number of the same being suppressed in the projecting stage as above described.

It will be apparent that this invention may be carried out with other filters than red and green, and that further its application is not limited to color cinematography, it having beneficial results when used in any apparatus for projecting pictures in substantially natural colors.

The process according to this invention is illustrated diagrammatically in the accompanying drawings in which Figure 1 is a diagrammatic illustration of the taking process.

Figure 2 is a diagrammatic illustration of the projection process.

Figure 3 is a side elevation of a projector attachment for use in carrying out this invention.

Figure 4 is a fragmentary sectional view showing one adjustment of the projector attachment, and Figure 5 is an enlarged sectional view showing a further adjustment.

Figure 6:
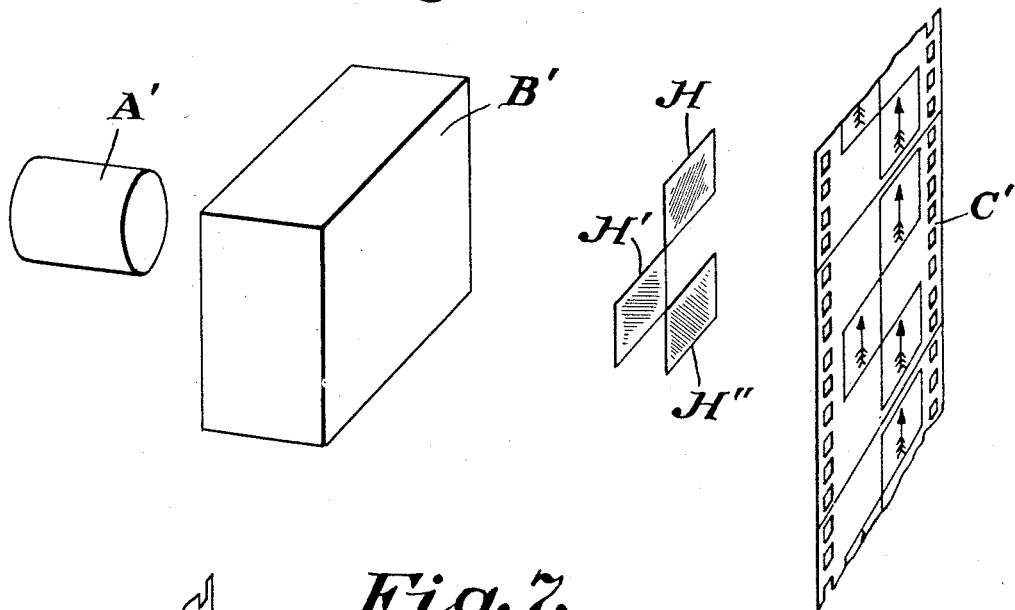
Fig. 6 is a diagrammatic illustration of the taking in the three-color process.

Referring to the drawings, the object or group of objects is or are photographed through a single lens or lens unit A whereby parallax errors are avoided and the beam emerging from the lens unit A is split up by a composite prism unit B which is substantially in accordance with that described in co-pending U. S. A. patent application Serial No. 307,433 filed September 21, 1928. This prism B splits the beam into two parts which are brought to a focus on the film C, suitable corrections being made in the prism B and the two parts of the beam pass through orange and blue-green filters D, $D^1$ respectively, the pictures being disposed diagonally within a single monochromatic space. This system of taking the cinematograph pictures as covered in the U. S. A. patent application above referred to. The projection arrangement is shown in Figure 2 in which C is the film which has previously been taken by means of the taking process illustrated in Figure 1. In place of the two filters, one for each part of the picture, shown in Figure 1, I employ in the projection process only one filter E which may be of the same tint as the orange filter D used in the taking process. The other part of the beam does not pass through a filter and I have shown at $E^1$ a clear space to indicate that no filter is provided in the beam. A split lens F is provided to focus the two composite beams on the screen G and to bring the component images into register.

Figures 3, 4 and 5 show a projector attachment for use in carrying out the projection process according to this invention; $a$ is a fixed sleeve within which is arranged a further sleeve b. The sleeve a is slotted as at $a^1$ to allow a pin $b^1$ on the sleeve b to pass through the sleeve a and two standards $a^2$ are provided in the sleeve a, these standards carrying adjusting screws $a^3$ bearing at their inner ends on the pin $b^1$. By means of these screws $a^3$ the relative position of the sleeve b within the sleeve a can be adjusted to a fine degree of accuracy. The forward end of the sleeve b carries the divided lens system g, $g^1$, means being provided to adjust the separation of the lenses. Each half of the lens unit comprises a semi-cylindrical member, the two members being placed base to base and united by any suitable means. As shown, more particularly in Figure 5, the uniting means comprise four sets of push and pull screws, two on each side of the device. The push screws h screw through one part and abut at their ends on the other part, while the pull screws $h^1$ screw into the other part. The push screws h will separate the two semi-cylindrical members, whilst the pull screws $h^1$ will draw them together. Suitable adjustment of the push screws h and the pull screws $h^1$ will enable the separation of the lenses to be adjusted and will further enable the lenses to be locked in the adjusted position. Any other known type of adjustment may, of course, be employed. A filter is provided in one semi-cylindrical member while the other member is unprovided with a filter.

The adjustments above referred to for rotating and separating the lenses will enable the component pictures to be accurately registered and focussed on the screen G.

In Fig. 6, A' represents a conventional lens unit and B' a conventional light divider which splits the beam into three parts which are separately brought to a focus on the film C' to form three pictures arranged in any conventional manner, for example, as shown. Interposed between the film and the light divider are the three filters H, H', and H'', each serving for a separate picture on the film C'. The partial shading on these separate filters is merely to indicate that they are each of a different color, and it is to be expressly understood that they do not represent any particular color, the appropriate set, or sets, of filters which may be used for this purpose being well known in the art.

Figure 7:
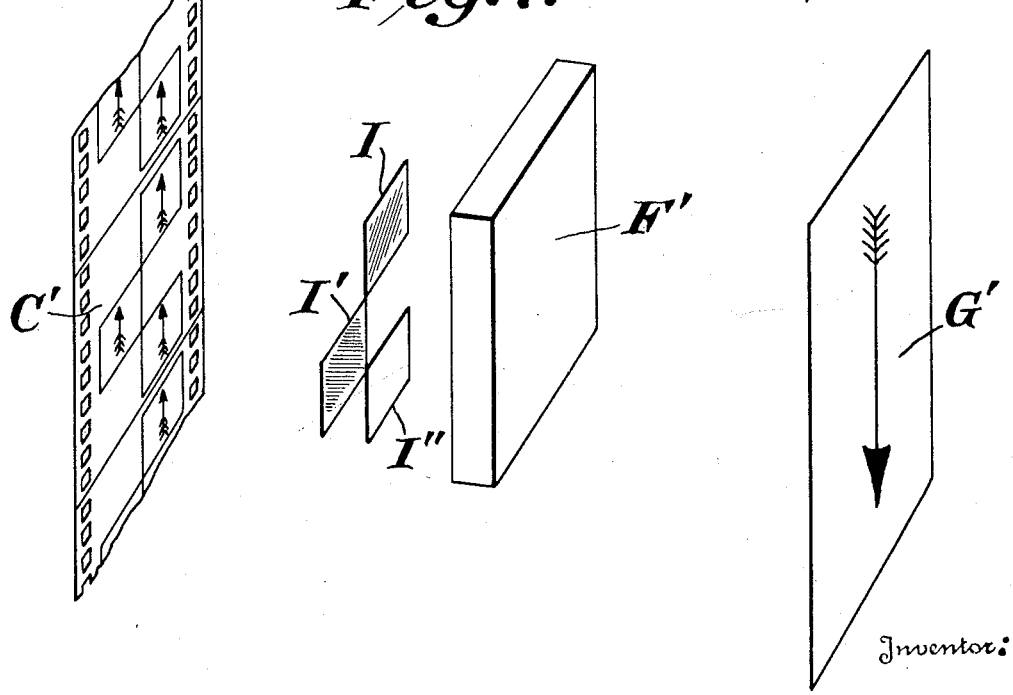
Fig. 7 is a diagrammatic illustration of the projection in the three-color process.

In Fig. 7, the film C' is that taken as above described, and its three pictures are combined by the conventional light combiner F' to bring them into registry in the single picture on the screen G'. As shown, before being combined, the light from two of the pictures on the film passes through two filters I and I' while no filter appears at I'' before the third film picture. This is an essential feature of the invention as has been described. It will also be understood that the filter provided for each picture in the projecting operation is the same as the filter through which that picture was taken.

I claim:—

1. A method of exhibiting pictures or the like in substantially natural colors by cinematography consisting in providing two pictures of the same object or group of objects taken simultaneously through differently colored complementary or substantially complementary filters and simultaneously projecting the said two pictures on to the screen in super-imposition, one being projected through a like filter to that through which it was taken and the other being projected without the interposition of a filter.

2. A method of exhibiting pictures or the like in substantially natural colors by cinematography consisting in providing two simultaneously taken pictures of the same object, one through a substantially red filter and the other through a substantially green filter and simultaneously projecting the said two pictures on to the screen in super-imposition, the picture taken through the red filter being projected through a red filter and the picture taken through the green filter being projected without the interposition of a filter.

3. A method of exhibiting pictures or the like in substantially natural colors by cinematography consisting in providing three simultaneously taken exposures of the object or objects, each exposure being taken through an appropriate color screen, and projecting the three pictures thus obtained simultaneously on to the screen in super-imposition, two being projected through like filters to those used in the taking process and the other being projected without the interposition of a filter so that the color corresponding thereto is evoked by contrast substantially as described.

4. A method of exhibiting pictures or the like in substantially natural colors by cinematography consisting in providing two simultaneously taken pictures of the same object or group of objects, one through a red filter and the other through a bluish green filter and simultaneously projecting the said two pictures on to a screen in super-imposition, one being projected through a like filter to that through which it was taken, and the other being projected without the interposition of a filter.

5. A method of exhibiting pictures or the like in substantially natural colors by cinematography consisting in providing a plurality of simultaneously taken pictures of the same subject, each picture being taken through an appropriate color screen, and simultaneously projecting the plurality of pictures onto the screen in super-imposition, at least one of said pictures being projected through a like filter to that used in the taking thereof, and the remainder of the plurality of pictures being projected with white light only.

ANTHONY BERNARDI.